No. 830,405. PATENTED SEPT. 4, 1906.
R. S. BLAIR.
EYEGLASSES.
APPLICATION FILED NOV. 11, 1905.

WITNESSES: INVENTOR
R. S. Blair
BY
Warfield & Dudd
ATTORNEYS

UNITED STATES PATENT OFFICE.

ROBERT S. BLAIR, OF NEW YORK, N. Y.

EYEGLASSES.

No. 830,405.  Specification of Letters Patent.  Patented Sept. 4, 1906.

Application filed November 11, 1905. Serial No. 286,817.

*To all whom it may concern:*

Be it known that I, ROBERT S. BLAIR, a citizen of the United States, residing at New York, in the county of New York and State of New York, have invented certain new and useful Improvements in Eyeglasses, of which the following is a full, clear, and exact description, such as will enable others skilled in the art to which it appertains to make and use the same.

This invention relates to eyeglasses and the like.

One of the objects thereof is to provide efficient and practical means for preventing accidental detachment of eyeglasses.

Another object is to provide means of the above type which shall be readily placed in operative position and removed when desired.

Another object is to provide means adapted to insure the correct positioning of the glasses or lenses with respect to the eye.

Other objects will be in part obvious and in part pointed out hereinafter.

The invention accordingly consists in the features of construction, combinations of elements, and arrangement of parts, which will be exemplified in the device hereinafter described and the scope of the application of which will be indicated in the following claims.

Figure 1:
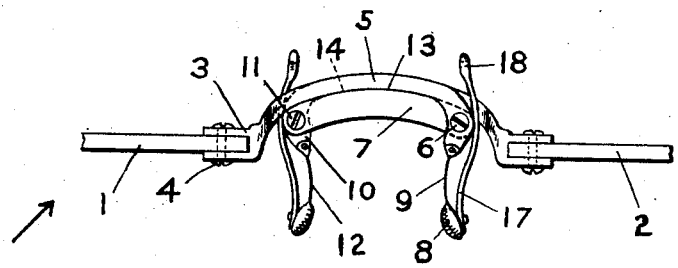
Figure 3:
Figure 2:
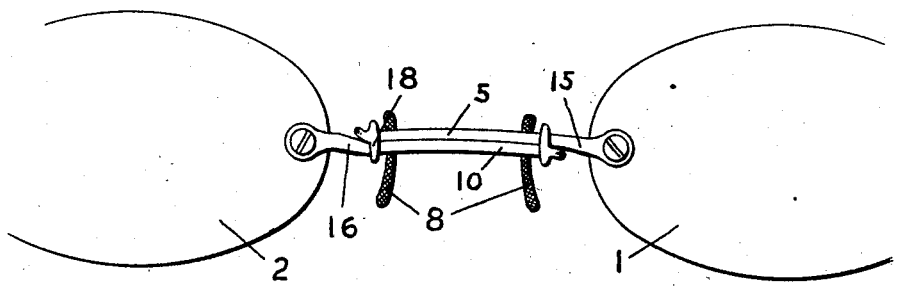

In the accompanying drawings, wherein is shown one of various possible embodiments of my invention, Figure 1 is a plan of the same. Fig. 2 is a front elevation of the same. Fig. 3 is a detail perspective of a connecting member with stopping means formed thereon.

Similar reference characters refer to similar parts throughout the several views of the drawings.

This invention will be most readily understood if the following facts be borne in mind: With many types of eyeglasses, and particularly those of the rimless form now in general use, the entire device is of an essentially fragile character, and even a slight blow may cause the fracture of the lenses. If the glasses are to be securely mounted in position without the unpopular expedient of employing a chain or other auxiliary retaining device, I have found that the pressure upon the nose is often so intense as to be disagreeable. In this connection it is of interest to note that when the glasses are brushed or struck from the face, which is the most common way in which the same are broken, it is in the vast majority of cases occasioned by a blow or thrust exerted against the outer end of one of the lenses in a general direction away from the face. It may also be noted that the utility of glasses depends largely upon the correctness with which they are positioned, as a comparatively slight error in the alinement of the lenses will often render the effect of the glasses injurious rather than beneficial. It is difficult, however, in the case of many forms of glasses now in general use to attain this result, inasmuch as the alinement of the lenses depends to a considerable extent upon the distance at which the nose-pads are spaced, and thus the correctness of the alinement depends upon the exact position in which the glasses are placed.

The above and other defects are remedied and many positive advantages attained in constructions of the nature of that hereinafter described.

Referring now to Fig. 1 of the accompanying drawings, there are shown glasses or lenses 1 and 2, which may be of any desired type, but are herein shown as of the rimless form. To the glass 1 is secured in any desired manner, as by clevis 3, fitted to the same and held in place by the screw 4, a bell-crank lever 5, pivotally mounted, as at 6, upon a cross-bar 7. The remaining arm of this lever passes "inwardly" or toward the nose with the glasses mounted in operative position and is provided with a nose-pad 8. The portion 9 of the bell-crank lever 5 is preferably formed of a flat spring of the desired stiffness for a purpose hereinafter described. Glass 2 is similarly connected, as by a clevis and screw, to a lever 10, pivoted, as at 11, to the cross-bar 7. The remaining arm of this lever, which is secured thereto in any desired manner, is in this illustrative embodiment formed of a spring 12, similar to the part 9 and provided in like manner with a nose-pad. The spring portions 9 and 12 are secured to the corresponding levers by any desired means, as soldering, riveting, or otherwise.

Upon cross-bar 7 are formed projecting portions or surfaces 13 and 14, respectively adapted to act as stops for the levers 5 and 10 and, upon the same being swung outwardly, as by pressure tending to throw apart the nose-pads 8, to bring the glasses exactly into the same plane or into other predetermined relative position, if desired. Levers 5 and 10 are preferably offset, as shown at 15 and 16, so as to bring the axes of the glasses 1 and 2 into alinement and to lie smoothly adjacent one another, as shown in Fig. 2 of the drawings.

The nose-pads 8 are provided with rigid curved releasing-levers 17, which project, as shown in the drawings, forwardly from the same and are provided with the finger-grips 18. These levers on account of their curved disposition and abutment against levers 5 and 10 are adapted upon being pressed toward one another to curve back the respective springs to which they are connected, and thus draw apart the nose-pads, and grips 18 are so formed and positioned as to permit the desired swinging movement of the main levers.

The method of use of the above-described embodiment of my invention is substantially as follows: Assuming that it be desired to place the glasses upon the nose, the finger-grips 18 are compressed toward one another, thus throwing the levers 5 and 10 against their respective stops, holding the lenses or glasses in the same plane and curving back each of the springs 9 and 12. The glasses are then raised by means of these grips and the pads placed upon either side of the nose in the desired position, whereupon the grips are released, and the reaction of the springs presses the nose-pads against the corresponding sides of the nose. These springs, however, are so adjusted as to remain under tension when the glasses are mounted upon the nose, and thus by their reaction hold the nose-pads, which are within the plane of the glasses, firmly against the nose and keep the lenses in alined position. By the expression "within the plane of the glasses" as used above and in certain of the following claims is meant a position which is not upon the outer side of the plane of the glasses—that is, is limited by such plane. If with the glasses thus mounted any blow be struck upon them or any thrust exerted in a direction such as is roughly indicated by the arrow in Fig. 1 of the drawings, the corresponding glass will tend to swing upon its pivot 6, thus tending to throw the opposite nose-pad 8 more firmly against the nose and by its reaction with the remaining nose-pad to pinch the nose with a pressure determined by the force of the blow which has been struck. This pressure of course may be far above that which would be practicable to employ constantly without serious personal inconvenience, but on account of its short duration may reach a considerable degree without annoyance, and the glass is thus held firmly in position at precisely the time when such holding is of prime importance. If a similar blow or thrust be exerted upon glass 2, the opposite nose-pad 8 will be thrust inwardly in a manner which should be obvious from the above description.

When it is desired to remove the glasses from operative position, the grips 18 are merely compressed, thus forcing apart the nose-pads and permitting the easy removal of the glasses, which may then be inserted in a case of any desired form, preferably such as will permit the glasses to rest therein in extended position with the grips uppermost.

It will thus be seen that I have provided a simple, inexpensive, and compact device which is well adapted to achieve the objects of my invention. On account of the fact that a high pressure is exerted only at the time when such pressure is needed this may attain proportions largely in excess of the limit which would be otherwise practicable, and the holding of the glasses in operative position may thus be assured. On account of the handling of the glasses, moreover, by means of the finger-grips any soiling of the same, such as constantly occurs when the same are handled by the lenses in placing them upon the nose, is obviated. The lenses or glasses proper, moreover, are automatically maintained in the desired relative position irrespective of any adjustment or degree of spacing of the nose-pads, and they may thus be mounted on different portions of the nose without affecting this adjustment. Moreover, on account of the last-mentioned feature any given pair of glasses embodying my invention posesses a greater range of adapability for use on different faces, thus reducing the number of sizes which it is necessary for dealers to carry in stock. The entire device while of simple and non-complicated construction is nevertheless of the most efficient and thoroughly-reliable action and is well adapted to meet the requirements of practical use.

It may here be noted that by the term "glass" as used throughout the following claims is meant the individual glass or lens.

As many changes could be made in the above construction and many apparently widely-different embodiments of my invention could be made without departing from the scope thereof, I intend that all matter contained in the above description or shown in the accompanying drawings shall be interpreted as illustrative and not in a limiting sense.

I desire it also to be understood that the language used in the following claims is intended to cover all of the generic and specific features of the invention herein described and all statements of the scope of the invention which as a matter of language might be said to fall therebetween.

Having described my invention, what I claim as new, and desire to secure by Letters Patent, is—

1. In a device of the class described, in combination, a pair of glasses, a pair of members adapted to engage opposite sides of the nose and hold said glasses in operative relation to the eyes, and means connecting said glasses and said members adapted upon one of said glasses swinging away from the corresponding eye to tend to press the opposite member more firmly against the nose.

2. In a device of the class described, in combination, a pair of glasses, a pair of members adapted to engage opposite sides of the nose and hold said glasses in operative relation to the eyes, and means connecting said glasses and said members adapted upon one of said glasses swinging away from the corresponding eye to tend to press both of said members more firmly against the nose.

3. In a device of the class described, in combination, a pair of glasses, a pair of members adapted to engage opposite sides of the nose and hold said glasses in operative relation to the eyes, and means connecting said glasses and said members adapted upon one of said glasses swinging away from the corresponding eye to tend to press one of said members more firmly against the nose, said members being when in operative position upon the face, disposed upon the side of the plane of said glasses toward the eyes.

4. In a device of the class described, in combination, a pair of glasses, a pair of members adapted to engage opposite sides of the nose and hold said glasses in operative relation to the eyes, and means connecting said glasses and said members adapted upon one of said glasses swinging away from the corresponding eye to tend to press one of said members more firmly against the nose, said members being when in operative position upon the face within the plane of said glasses.

5. In a device of the class described, in combination, a pair of glasses and means comprising members engaging opposite sides of the nose and holding said glasses in operative relation to the eyes, each of said glasses being connected to the member upon the opposite side of the nose and each of said glasses being adapted to swing relative to the other glass in a direction transverse to its plane.

6. In a device of the class described, in combination, a pair of glasses and means comprising members adapted to engage opposite sides of the nose and hold said glasses in operative relation to the eyes, each of said glasses being connected with the member upon the opposite side of the nose and being adapted to swing about a pivotal point with reference to the other glass.

7. In a device of the class described, in combination, a pair of glasses, members engaging opposite sides of the nose and adapted to hold said glasses in operative relation upon the face, each of said glasses being connected with a member upon the opposite side of the nose, and a third member to which each of the connecting means is pivoted.

8. In a device of the class described, in combination, a pair of glasses, members engaging opposite sides of the nose and adapted to hold said glasses in operative relation to the eyes, and resilient means connecting each of said glasses to the member upon the opposite side of the nose, each of said glasses being adapted to swing relative to the other glass in a direction transverse to its plane about a pivotal point.

9. In a device of the class described, in combination, a pair of glasses, members engaging opposite sides of the nose and adapted to hold said glasses in operative relation to the eyes, resilient means connecting each of said glasses with the member upon the opposite side of the nose, and a third member to which each of the connecting means is pivoted.

10. In a device of the class described, in combination, a pair of glasses, a pair of members provided with frictional surfaces adapted respectively to engage opposite sides of the nose and hold the glasses respectively in operative relation to the eyes, and means interposed between said glasses and said members adapted upon one of said glasses being swung away from the corresponding eye, to tend to cause said members to approach one another.

11. In a device of the class described, in combination, a pair of glasses, a pair of members provided with frictional surfaces adapted respectively to engage opposite sides of the nose and hold the glasses respectively in operative relation to the eyes, and means comprising springs interposed between said glasses and said members adapted upon one of said glasses being swung away from the corresponding eye, to tend to cause said members to approach one another.

12. In a device of the class described, in combination, a pair of glasses, a pair of members provided with frictional surfaces adapted respectively to engage opposite sides of the nose and hold the glasses respectively in operative relation to the eyes, and means comprising a spring leading to each of said members interposed between said glasses and said members adapted upon one of said glasses being swung away from the corresponding eye to tend to exert a resilient pressure upon the nose through one of said members.

13. In a device of the class described, in combination, a pair of glasses, a pair of nose-engaging members adapted frictionally to engage opposite sides of the nose, a member positioned between said glasses, a resilient member extending from each of said nose-engaging members toward said second member, and relatively rigid means connected with each glass and extending toward and operatively connected with the spring of the opposite nose-engaging member.

14. In a device of the class described, in combination, a pair of glasses, a pair of nose-engaging members adapted frictionally to engage opposite sides of the nose, a member positioned between said glasses, a resilient member extending from each of said nose-engaging members toward said second member, and relatively rigid means connected with each glass and extending toward and operatively connected with the spring of the opposite nose-engaging member each of said rigid members being free from the adjacent end of said second member and connected with the remote end thereof and being adapted to rest against said member with said glasses in operative position.

15. In a device of the class described, in combination, a pair of glasses, a pair of nose-engaging members adapted frictionally to engage opposite sides of the nose, a member positioned between said glasses, and means extending from each of said glasses to the opposite nose-engaging member and connected with the remote end of said second member said means being adapted normally to rest against said second member and being free from the adjacent end thereof.

16. In a device of the class described, in combination, a pair of glasses, a pair of nose-engaging members adapted frictionally to engage opposite sides of the nose, a member positioned between said glasses, a resilient member extending from each of said nose-engaging members toward said second member, relatively rigid means connected with each glass and extending toward and operatively connected with the spring of the opposite nose-engaging member, and means adapted to bend said springs and to swing apart said nose-engaging members.

17. In a device of the class described, in combination, a pair of glasses, a pair of nose-engaging members adapted frictionally to engage opposite sides of the nose, a member positioned between said glasses, means extending from each of said glasses to the opposite nose-engaging member and connected with the remote end of said second member said means being adapted normally to rest against said second member and being free from the adjacent end thereof, and means adapted to swing said nose-engaging members away from the nose.

18. In a device of the class described, in combination, a pair of glasses, a pair of members adapted to engage opposite sides of the nose and hold the glasses in operative relation to the eyes, means connecting said glasses and said members adapted upon one of said glasses swinging away from the corresponding eye to tend to press the opposite member more firmly against the nose, and adapted upon one of said glasses swinging in the opposite direction to arrest the same with both of said glasses lying substantially in the same plane.

19. In a device of the class described, in combination, a pair of glasses, a pair of members adapted to engage opposite sides of the nose and hold the glasses in operative relation to the eyes, means connecting said glasses and said members adapted upon one of said glasses swinging away from the corresponding eye to tend to press both of said members more firmly against the nose, and adapted upon said members tending to swing relatively one to another in the opposite direction to arrest such swinging movement with both of the glasses lying substantially in the same plane.

20. In a device of the class described, in combination, a pair of glasses, members adapted to engage opposite sides of the nose and hold said glasses in operative relation to the eyes each of said glasses being connected to the member upon the opposite side of the nose and each being adapted to swing relative to the other glass in a transverse plane about a pivotal point, and means adapted to arrest relative swinging movement in an inward direction with said glasses lying substantially in the same plane.

21. In a device of the class described, in combination, a pair of glasses, a pair of members adapted to engage opposite sides of the nose and hold said glasses in operative relation to the eyes, means connecting each of said glasses with the member upon the opposite side of the nose, a third member to which each of said connecting means is pivoted, and adapted to arrest inward-swinging movement of said glasses relative one to another with both of said glasses lying substantially in the same plane.

22. In a device of the class described, in combination, a pair of glasses, a pair of members adapted to engage opposite sides of the nose, means comprising a spring adapted to connect each of said glasses with the member upon the opposite side of the nose and permit each of said glasses to swing relative to the other out of the plane in which it is positioned, and a relatively rigid member connected with each of said springs adjacent said first-mentioned members adapted upon relative movement to draw said first-mentioned members away from the nose.

23. In a device of the class described, in combination, a pair of glasses, a pair of members adapted to engage opposite sides of the nose, means comprising a spring adapted to connect each of said glasses with the member upon the opposite side of the nose and permit each of said glasses to swing relative to the other out of the plane in which it is positioned, a relatively rigid member connected with each of said springs adjacent said first-mentioned members adapted upon relative movement to draw said first-mentioned members away from the nose, and means adapted to arrest the relative swinging movement of said glasses in an inward direction in a position with both the said glasses lying substantially in the same plane.

24. In a device of the class described, in combination, a pair of glasses, a pair of members adapted to engage opposite sides of the nose and hold said glasses in operative relation to the eyes, means connecting each of said glasses with the member upon the opposite side of the nose said means comprising a spring, and being adapted to permit each of said glasses to swing outwardly relative to the other glass about a pivotal point, means adapted upon said glasses swinging inwardly relative one to another to arrest such movement with both of said glasses lying substantially in the same plane, and means connected with said springs adjacent said first-mentioned members adapted upon relative movement to withdraw said first-mentioned members from the nose.

25. In a device of the class described, in combination, a pair of glasses, a pair of nose-pads, a cross-bar, a lever connected to each of said glasses and pivoted to said cross-bar, a spring connecting each of said levers with the nose-pad on the side of the nose remote from the glass connected to the corresponding lever, said glasses being adapted to swing outward relatively one to another, said cross-bar being provided with portions adapted to limit the inward-swinging movement of said glasses with the same lying substantially in the same plane, and means adapted to withdraw said nose-pads from the nose.

26. In a device of the class described, in combination, a pair of glasses, a pair of nose-pads, a cross-bar, a lever connected to each of said glasses and pivoted to said cross-bar, a spring connecting each of said levers with the nose-pad on the side of the nose remote from the glass connected to the corresponding lever, said glasses being adapted to swing outward relatively one to another, said cross-bar being provided with portions adapted to limit the inward-swinging movement of said glasses with the same lying substantially in the same plane, and relatively rigid means connected with said springs adjacent said nose-pads and spaced from said springs adapted upon relative movement toward one another to withdraw said nose-pads from the nose.

27. In a device of the class described, in combination, a pair of glasses, a pair of members provided with frictional surfaces adapted respectively to engage opposite sides of the nose and hold the glasses respectively in operative relation to the eyes, and means interposed between said glasses and said members adapted upon one of said glasses being swung away from the corresponding eye to tend to cause said members to approach one another, said means being adapted to permit a substantially free outward-swinging movement of said glasses and to arrest their return movement with the glasses substantially in the same plane.

28. In a device of the class described, in combination, a pair of glasses, a pair of members provided with frictional surfaces adapted respectively to engage opposite sides of the nose and hold the glasses respectively in operative relation to the eyes, and means interposed between said glasses and said members adapted upon one of said glasses being swung away from the corresponding eye to tend to cause said members to approach one another, and upon the glass being swung back to arrest the same in a position substantially in the plane of the other glass.

29. In a device of the class described, in combination, a pair of glasses, a pair of members provided with frictional surfaces adapted respectively to engage opposite sides of the nose and hold the glasses respectively in operative relation to the eyes, and means interposed between said glasses and said members adapted upon one of said glasses being swung away from the corresponding eye to tend to cause said members to approach one another, said pair of members being normally positioned upon the inner side of the plane of said glasses.

In testimony whereof I affix my signature in the presence of two witnesses.

ROBERT S. BLAIR.

Witnesses:
C. CARSON,
BENJ. R. JOHNSON.